Figure 1:
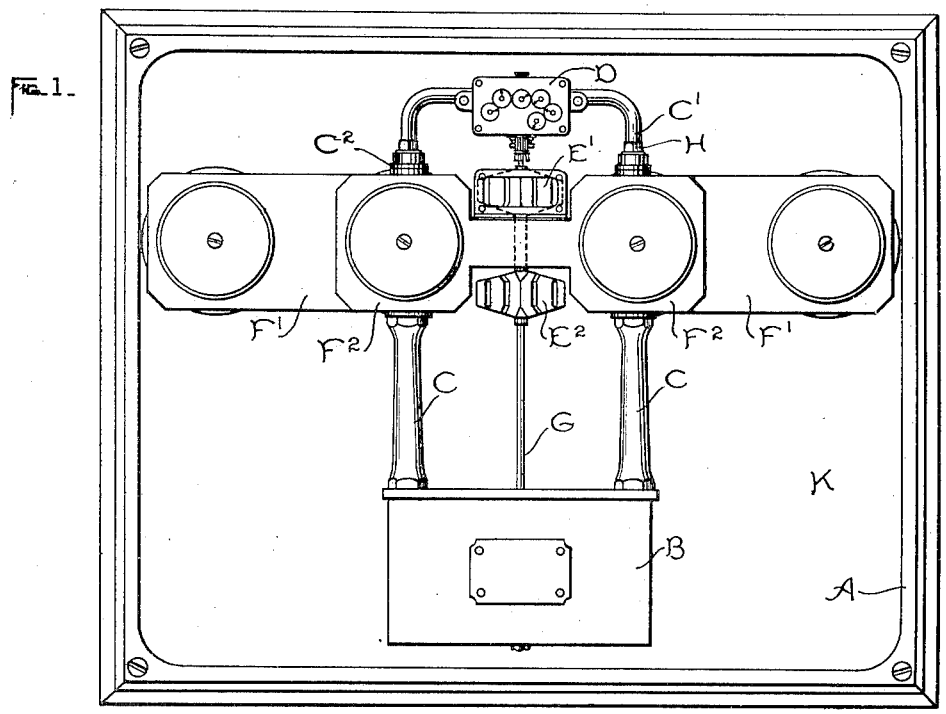

No. 649,707.  
W. H. PRATT.  
ELECTRIC METER.  
(Application filed Feb. 27, 1899.)  
(No Model.)  
Patented May 15, 1900.  
2 Sheets—Sheet 1.

WITNESSES  
Edw. Williams Jr.  
A. F. Macdonald.

INVENTOR.  
William H. Pratt  
by Albert G. Davis  
Atty.

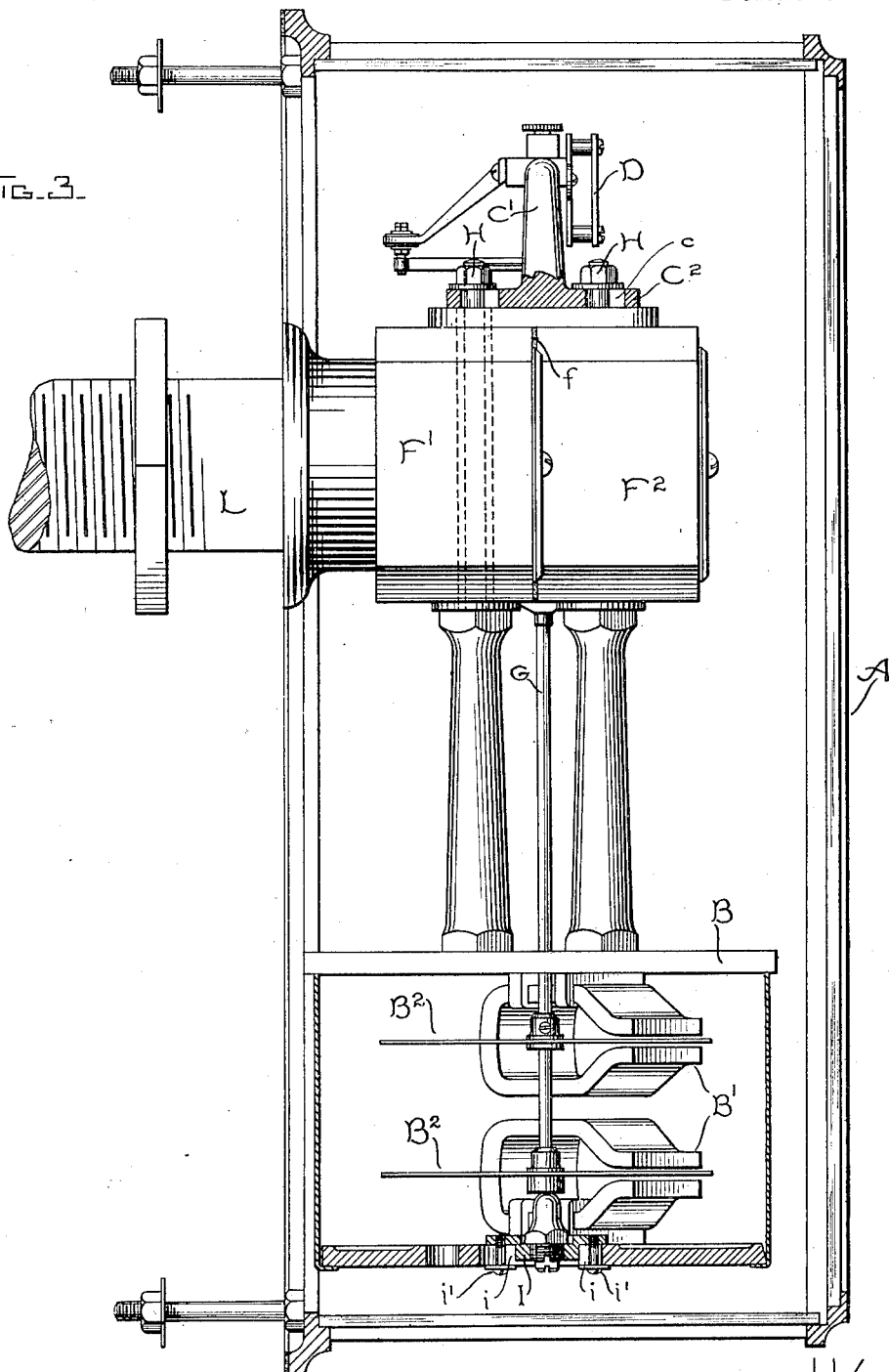

UNITED STATES PATENT OFFICE.

WILLIAM H. PRATT, OF LYNN, MASSACHUSETTS, ASSIGNOR TO THE GENERAL ELECTRIC COMPANY, OF NEW YORK.

ELECTRIC METER.

SPECIFICATION forming part of Letters Patent No. 649,707, dated May 15, 1900.

Application filed February 27, 1899. Serial No. 706,905. (No model.)

*To all whom it may concern:*

Be it known that I, WILLIAM H. PRATT, a citizen of the United States, residing at Lynn, in the county of Essex, State of Massachusetts, have invented certain new and useful Improvements in Electric Meters, (Case No. 941,) of which the following is a specification.

My present invention relates to a novel means for calibrating electric meters, so that they may register with increased accuracy. It is well adapted to meters for recording large outputs, though its principal utility is with those which are used on the well-known three-wire system of distribution, whether large or small. One form of such meters (and this is the form which I have illustrated in this application) uses two armatures, one of which is placed above and the other below a large copper conductor which forms the series field, the armatures being of course connected in shunt in the usual way across the lines. This arrangement prevents any deleterious action of stray fields upon the meter. In the three-wire type of meter it is necessary for well-known reasons to use two different fields, one in each side of the three-wire system. The armature may be either connected across the outside mains or in the double-armature form of meter which I have just briefly described there may be two commutators, and one armature may be connected in each side of the system. Ordinarily this will not be desirable, as the percentage of error in the common form of connection is very small, and the other arrangement increases friction and complication. With meters of this form it is desirable that the "constant" of the two sides of the meter—that is, the percentage of energy which is actually measured and which should always bear the same relation to the total energy in the system—should be the same. The reasons for this, while apparent to the engineer, are, briefly, that because of the unbalanced conditions which may obtain at times upon the three-wire distribution a record which is not accurately proportioned to the total energy in the system may otherwise be obtained. The ordinary means of adjusting the meter are not efficacious for this condition, the moving of the magnets affecting the total registration, but not changing the proportions between the two sides of the system, so that if one side registers a greater percentage of energy than the other this would not be compensated for. Under these circumstances I effect the calibration of the meter by an adjustment of the position of the armature in the magnetic field of the conductors. Ordinarily the two field-conductors already referred to are disposed side by side and the armature rotates in close proximity to them. In former types of meter it has been centered with the line of division between the two conductors. By my invention, however, this is no longer the case. If one of the fields be proportionately stronger than the other for any reason, either by inequality in the conductivity of the copper of which they are commonly composed or by some variation in size, the position of the armature may be changed so as to be slightly nearer the weaker field, and thus get a higher effective magnetization. In this way the calibration of the two sides of the meter may be brought to as near equality as is desired.

The accompanying drawings show a meter constructed so as to embody the invention.

Figure 2:
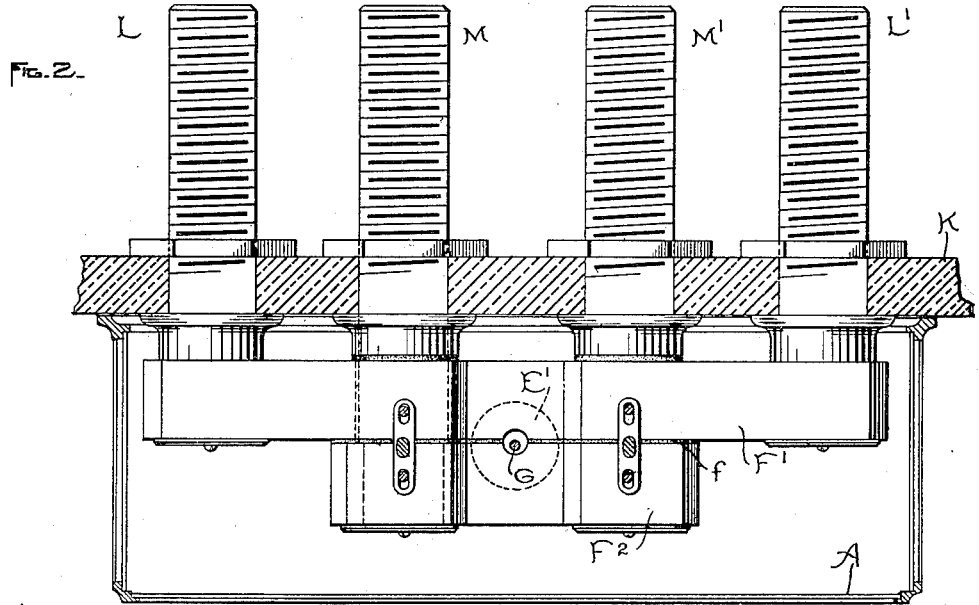

Figure 1 is a front elevation, Fig. 2 a plan, partly in section, and Fig. 3 a side elevation, also partly in section, of the meter.

A is the frame or case surrounding the meter.

K is the switchboard or other backing, to which the apparatus is attached by means of the studs L L' M M'. The field F' in one of the lines is in electrical connection with the studs L L'. The field $F^2$ in the other line is in similar electrical connection with the studs M M' and is insulated from the field F' in any suitable way at $f$. (See Figs. 2 and 3.) The studs M M' pass through the bar forming the field F', but are insulated from it, as shown in dotted lines in Fig. 2.

B is the box containing the magnetic drag, now well understood, the magnets B' acting upon the copper disks $B^2$ $B^2$. The shaft G carries the armatures E' $E^2$, the windings being connected in series and having a single commutator and being so arranged that the armatures rotate in the same direction. The shaft drives the counting mechanism D, of well-known construction, and it is itself supported in suitable bearings. (See Figs. 1 and 3.) Standards C C connect the fields and the box containing the drag, the box being made of iron, so as to form a screen between the magnets and any extraneous magnetism as well as the powerful fields of this type of meter. A standard C' on the top of the fields supports the upper bearing of the shaft and is secured in place by the bolts H. The lower part $C^2$ of the standard is expanded to form a base and has slots $c$, in which the bolts H H are placed. An analogous construction is employed at the base of the shaft, I being a plate movable in an opening in the base of the box B, slots $i$ being formed therein. This plate carries the jewel-bearing at the base of the shaft and by means of the screws $i'$ may be secured in any desired position.

Referring to Fig. 2, it will be seen that the shaft G is in this instance considerably nearer the field $F^2$ than the field $F'$, the latter being in this case the stronger of the two fields. Of course if the contrary were the case the shaft would be nearer the other, while if they were substantially equal it would occupy a median line. I have illustrated a particular type of meter as a convenient form for the purpose, and this especially because the invention is well adapted for use in connection with this type; but nothing in the invention limits it in this regard, as I consider the method of calibration herein disclosed—that is, by shifting the relative position of the armature and the field of force to get the desired adjustment—to be new so far as I am acquainted with the present construction of electric meters, and any construction which may utilize this method of calibration I consider within my invention. Of course it is within my invention to move the fields instead of the armature, but in general this is not desirable.

What I claim as new, and desire to secure by Letters Patent of the United States, is—

1. An electric-meter motor having an armature influenced by a plurality of electrically-independent fields, and means for adjusting the armature relatively to the fields to modify their individual effect.

2. An electric-meter motor having an armature influenced by a plurality of electrically-independent fields, and means for adjusting the armature relatively to the fields to equalize their torque relation under a determinate current value in each.

3. In a three-wire electric meter, the combination of a field in each of the outside lines, an armature within the inductive influence of the field, and means for changing the position of the armature to adjust its calibration.

4. In a three-wire meter, the combination of a copper bar forming the field in one side of the circuit, a second bar of different size from the first and disposed adjacent thereto forming the field in the other side of the circuit, an armature revolving within the inductive influence of the two fields, and adjusting devices for shifting the armature so as to make it approach one or the other field as may be desired to effect the calibration.

5. In an electric-motor meter, the combination of two different fields disposed in the same plane, with a compound armature part of which is upon one side and part upon the other of the fields, and means for changing the position of the axis of rotation of the armature relative to the fields so as to adjust their relative effect.

6. In a three-wire motor-meter, the combination of a horizontal copper bar forming one of the fields, a second bar forming the other, one of the bars being in one side and one in the other of the circuit, a compound armature connected across the lines, one part of which is above the fields and the other below, and means for adjusting the shaft so that the armature may be brought to a greater or less extent within the influence of one or the other of the fields as may be desired.

In witness whereof I have hereunto set my hand this 24th day of February, 1899.

WILLIAM H. PRATT.

Witnesses:
D. McKILLOP,
HENRY O. WESTENDARP.